May 3, 1932. M. W. CARROLL 1,856,905
PIPE HOLDER
Filed Jan. 4, 1930 2 Sheets-Sheet 1

Inventor
MONROE W. CARROLL.

By Hardway Cathey
Attorneys

May 3, 1932.   M. W. CARROLL   1,856,905
PIPE HOLDER
Filed Jan. 4, 1930   2 Sheets-Sheet 2

Inventor
MONROE W CARROLL

By Hardway Cathey
Attorneys

Patented May 3, 1932

1,856,905

UNITED STATES PATENT OFFICE

MONROE W. CARROLL, OF BEAUMONT, TEXAS, ASSIGNOR TO JEDDY D. NIXON, OF HARRIS COUNTY, TEXAS

PIPE HOLDER

Application filed January 4, 1930. Serial No. 418,640.

This invention relates to new and useful improvements in a pipe holder.

One object of the invention is to provide a holder of the character described specially designed for the purpose of holding a pipe suspended in a well during certain drilling operations.

Another object of the invention is to provide a holder of the character described embodying a novel type of bowl, or spider, having downwardly converging tracks with wedge shaped pipe engaging slips seated on said tracks and provided with antifriction bearings whereby said slips are mounted to readily release the pipe on the upward movement of the pipe relative to the holder.

Another object of the invention is to provide, in a pipe holder, a novel type of pipe holding slips so constructed and mounted that they will wedge securely against, and grip, the pipe while supporting the same but which will readily release the pipe upon upward movement of the pipe relative to the holder.

A further feature of the invention resides in the provision of means whereby the independent slip segments, hereinafter referred to, may be detachably secured to the bowl or spider, while the holder is in active use in making up or breaking up the string of pipe suspended in the bore.

With the above and other objects in view the invention has particular relation to certain novel features of construction, operation, and arrangement of parts, an example of which is given in this specification and illustrated in accompanying drawings wherein:—

Figure 1:
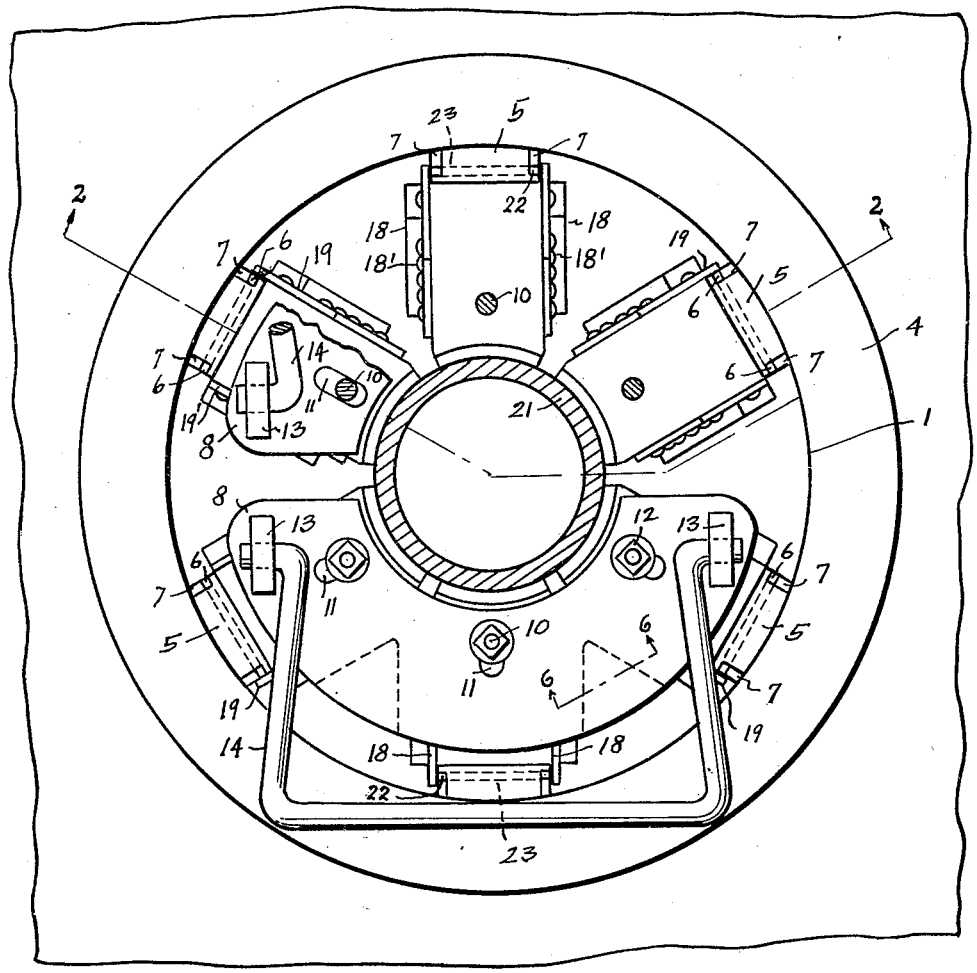
Figure 1 shows a plan view of the complete holder shown partly in section.
Figure 6:
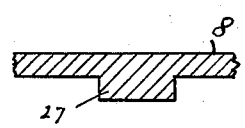
Figure 6 shows a fragmentary transverse sectional view of a slip retainer plate employed, taken on the line 6—6 of Figure 1.
Figure 5:
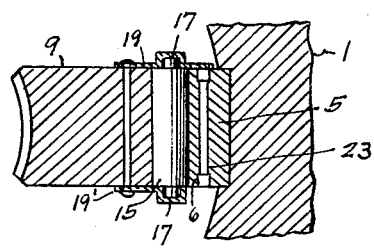
Figure 5 shows a fragmentary transverse sectional view taken on the line 5—5 of Figure 2.
Figure 2:
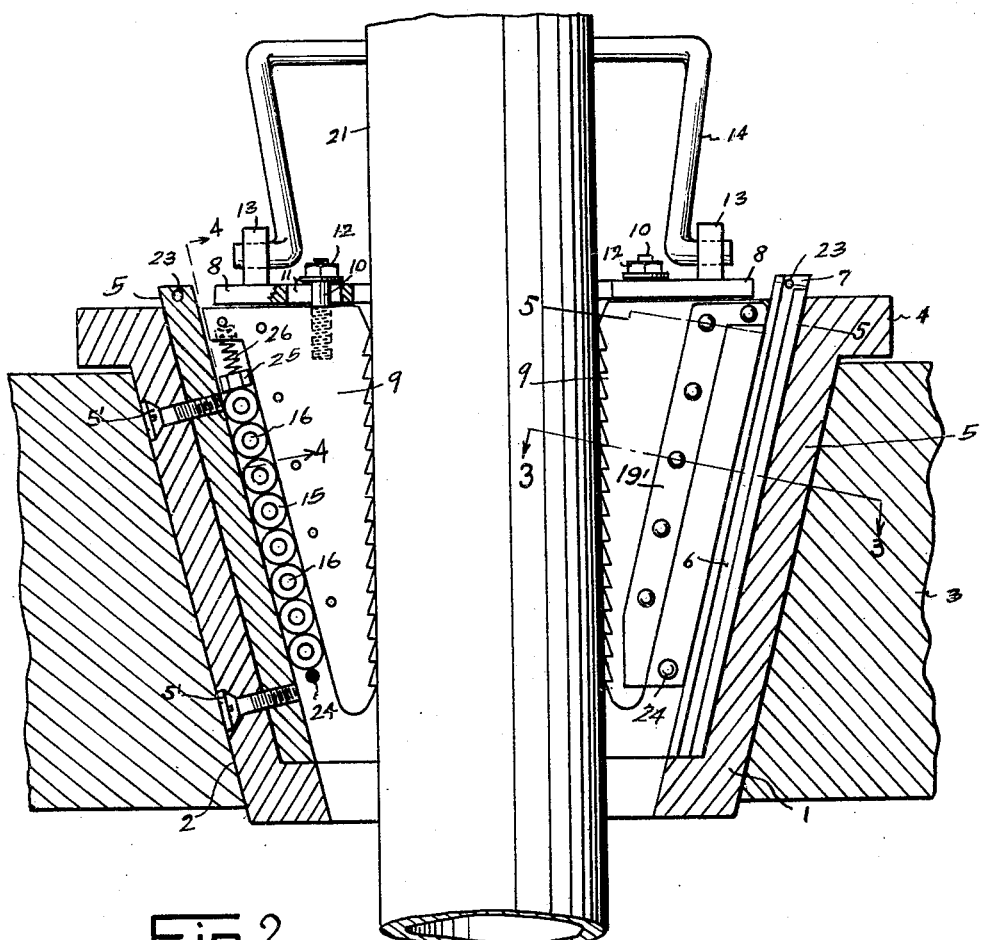
Figure 2 shows a vertical sectional view taken on the line 2—2 of Figure 1 showing one of the side plates removed.
Figure 4:
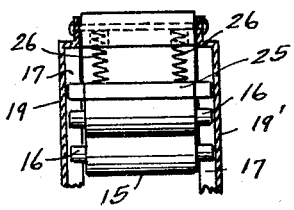
Figure 4 shows a fragmentary vertical sectional view taken on the line 4—4 of Figure 2.
Figure 3:
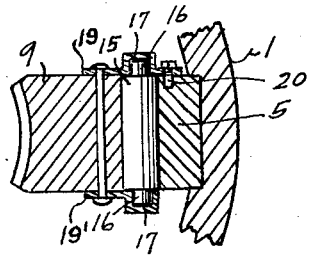
Figure 3 shows a fragmentary transverse sectional view taken on the line 3—3 of Figure 2.

Referring now more particularly to the drawings wherein like numerals of reference designate similar parts in each of the figures, the numeral 1 designates a spider which is circular in horizontal cross section and whose outer and inner walls converge downwardly. This spider is adapted to seat in a downwardly converging seat 2 of a rotary table, of a conventional rotary drilling machine, or other support. The upper end of the spider may have an annular external flange 4 to overlie the upper side of said rotary table and said spider has the inside downwardly converging tracks 5 suitably secured thereto and each track has the vertical side grooves 6, 6, therein whose upper ends as 7 are enlarged outwardly. These tracks are made of any suitable material adapted for the purpose and may be bolted to the spider by suitable bolts as 5' or secured in place in any other approved manner.

As shown there are two slip segments, each segment comprising an upper retainer plate as 8, of a general arcuate form, and the wedge shaped slips 9 depending therefrom. The slips 9 as shown are secured to the respective plates 8 by means of bolts as 10 which are fitted through radial slots 11 in said respective plates and attached to the slips beneath and whose upper ends have the retaining nuts 12 threaded thereon to prevent the detachment of the slips from said plates. Other means for attaching the slips to the retainer plates may be employed. The retainer plates 8 have the upstanding end bearings 13 and U-shaped handles 14 are provided whose ends are outwardly turned through said bearings and by means of which each slip segment may be handled as a unit. The outer margin of each slip 9 is provided with the roller bearings 15 and these bearings have the end pintles 16 which run in the inside grooves 17 of the respective side plates 18, 18 and 19, 19' fastened to opposite sides of the respective slips 9. As shown each slip segment has three slips and the middle slip has the side plates 18, 18, secured thereto, preferably by bolts 18' while the end slips of said segment have the respective side plates 19, 19' secured thereto. The side plates 18, 18 are extended outwardly so as to embrace one of the tracks 5, as shown in Figure 1 and these embracing margins have the inwardly extending bearing pins 20, 20 which run in the corresponding grooves 6 of the corresponding track. The respective side plates 19 are arranged nearer the central slips than the side plate 19' and have their outer margins extended, said extended margins abutting the inner sides of the adjacent tracks 5 in such manner as to maintain the slips in alignment with corresponding tracks on which they seat and also having pins as 20 which run in the corresponding grooves 6. The side plates 19' do not overlap the adjacent tracks 5.

In seating the slip segments in the spider, said segments may be handled independently through the handles or grips 14 and are disposed in confronting relation on opposite sides of the pipe 21 to be held with the slips 9 aligned with the corresponding tracks 5. The pins 20 are located at the lower ends of the respective plates 18 and in placing the slip segments in the spider seat about the pipe, said pins are passed inwardly along the outwardly turned upper ends 7 of the grooves 6 of the corresponding track and said pins then moved downwardly along said grooves as the slips are seated about the pipe.

In making up or breaking out a string of pipe, the pipe will be held suspended by the slips and to secure the engagement of the slips with the string the inner sides of the slips may be toothed as shown. When a section of the string is screwed onto the pipe, or unscrewed therefrom, the string is then lowered, if the string is being made up or elevated, if the string is being broken up and while being lowered or elevated the segments of the holder are pulled upwardly and laid on the rotary table and then when it is desired to screw on another section or unscrew one, the slip segments are again inserted as before, but while this operation is being carried on in order to prevent the complete detachment of the slip segments from the spider, a removable cross pin as 22 may be inserted through the transverse bearings 23, above the pins 20 and these cross pins will prevent the pins 20 from moving out of the upper ends of the grooves 6 and will thus prevent the detachment of the slip segments from the spider and will maintain said segments in position for their easy insertion into the spider about the pipe while the work of making up or breaking out the string of pipe is in progress.

When it is desired to completely detach the slip segments from the spider the pins 22 may be removed and the segments then lifted out.

The bearing rollers 15 are limited in their downward movement relative to the corresponding slip by the cross pins 24 against which they are held yieldingly by means of the cross heads 25 above which are seated against the coil springs or other yieldable means 26.

The plates 8 have the depending triangular lugs 27 between the slips 9 provided to limit the freedom of movement of said slips.

When pipe holders now in common use are employed the slips often wedge so tightly between the spider and the pipe to be held that when the pipe is pulled upwardly the slips will not release, but the entire spider and slips move upwardly with the pipe. It is the chief object of this invention to provide a practical type of pipe holder of such construction that the slips will readily release from the spider upon upward movement of the pipe and which will at the same time sustain any load to which the holder may be subjected.

The drawings and description disclose what is now considered to be a preferred form of the invention by way of illustration only, while the broad principle of the invention will be defined by the appended claims.

What I claim is:—

1. In a pipe holder a wedge shaped slip having a series of antifriction rollers movable longitudinally of the slip at its outer margin, a stop beneath and supporting said series, and a yieldable member bearing against the upper roller of said series.

2. In a pipe holder a wedge shaped slip having a longitudinal channel at its outer margin, said channel having side grooves, and a series of rollers in said channel having end pintles which run in said grooves.

3. In a pipe holder a wedge shaped slip having a longitudinal channel at its outer margin, said channel having side grooves, a series of rollers in said channel having end pintles which run in said grooves, a lower stop beneath the series of rollers and a yieldably mounted member which bears against the upper roller of the series.

4. A pipe holder including a spider having inside downwardly converging spaced tracks, pipe engaging means in the spider comprising independent slip segments, each segment including slips having external bearing rollers which bear against the respective tracks, a common means to which the slips of each segment are attached, and marginal abutments carried by the slips and arranged to engage said tracks to prevent rotative movement of the slips in the spider.

5. A pipe holder including a spider, downwardly converging tracks therein having side grooves, pipe engaging means in the spider composed of slip segments, each segment including a plurality of slips and a retainer plate to which the slips are attached, one slip of each segment having bearing members which are adapted to work in the grooves of a track.

6. A pipe holder including a spider, downwardly converging tracks therein having side grooves, pipe engaging means in the spider composed of slip segments, each segment including a plurality of slips and a retainer plate to which the slips are attached, one slip of each segment having bearing members which are adapted to work in the grooves of a track, and detachable means for preventing the disengagement of said bearing members from said grooves.

7. A pipe holder including a spider, downwardly converging tracks therein having side grooves, pipe engaging means in the spider composed of slip segments, each segment including a plurality of slips and a retainer plate to which the slips are attached, one slip of each segment having bearing members which are adapted to work in the grooves of a track, and rollers on the outer margins of the slips which are adapted to bear against the corresponding tracks.

8. In a pipe holder, a wedge shaped slip having a longitudinal channel in its outer margin, a series of rollers rotatable and longitudinally movable in said channel, a fixed stop on one side of said series and a yieldable stop on the other side of said series.

In testimony whereof I have signed my name to this specification.

MONROE W. CARROLL.